Aug. 9, 1966 A. TAVERA 3,264,973
PREPACKED COFFEE CONTAINING CARTRIDGE
Original Filed April 15, 1964

INVENTOR.
ANTONIO TAVERA
BY
Kimmel & Crowell
ATTORNEYS.

United States Patent Office 3,264,973
Patented August 9, 1966

3,264,973
PREPACKED COFFEE CONTAINING CARTRIDGE
Antonio Tavera, Rte. 1, Box 1386, Elk Grove, Calif.
Continuation of application Ser. No. 359,885, Apr. 15, 1964. This application Sept. 21, 1965, Ser. No. 488,913
10 Claims. (Cl. 99—295)

This invention relates to a prepacked coffee containing cartridge and more particularly to a reusable or disposable cartride containing a predetermined amount of coffee which may be readily positioned on a percolator to prepare a better tasting coffee in a more efficient manner, the instant application being a continuation of application Serial No. 359,885 filed April 15, 1964 and now abandoned, which in turn is a continuation-in-part, of application Serial No. 202,477 filed June 14, 1962 and now abandoned.

A primary object of this invention is the provision of various forms of reusable or disposable coffee containing cartridges which may be readily filled with a predetermined quantity of coffee and which is received on a conventional or a modified percolator, either electrically operated or adapted to be placed over a source of heat such as a range or the like, for quick and easy preparation of coffee.

Another object of this invention is the provision of a disposable coffee containing cartridge which will eliminate the necessity of measuring the coffee, as well as that of disposing of the coffee grounds after use, it being merely necessary to place the prefilled cartride on a percolator, use the same during the percolating of the coffee, and remove and dispose of the unit after use.

A further object of the invention is the provision of a device of the character described, certain embodiments of which may be used with a conventional percolator stem means, the conventional basket being removed, and other embodiments of which may be utilized with a special offset percolator stem means.

A still further object of the instant invention is the provision of a coffee containing cartridge in which all or certain parts of the same are reusable, these embodiments being designed for ready disassembly and cleaning.

Another object of the instant invention is the provision of a coffee containing cartridge with novel means for prepacking the same with a predetermined quantity of coffee and with novel means for supporting the quantity of coffee therewithin during use.

Yet another object of this invention is to provide a combination coffee percolator and cartridge wherein the cartridge may be readily removed after the coffee is made and before it is poured to preclude the possibility of coffee grounds getting into the coffee.

A further object of this invention is to provide a coffee percolator having a cover hingedly mounted to its lid for movement to a sealing position when the cartridge has been removed after the coffee is made.

An additional object of this invention is to provide a coffee percolator and cartridge combination which precludes the escape of steam or vapor thereby improving the taste and aroma of the coffee produced therein.

Another object of the instant invention is the provision of a coffee percolator wherein the cartridge may be removed and turned upside down to prevent leaking as in the removal of the conventional basket now in use.

Yet another object of this invention is to provide a coffee containing cartridge having a breather means defining a vent so dimensioned as to limit the escape of vapor thereby increasing the pressure within the cartridge above the coffee and forcing the water or vapor down through the coffee grounds under pressure to decrease the brewing time and increase the efficiency of the brewing operation whereby a maximum quantity of coffee may be prepared from a minimum quantity of coffee grounds.

Other and further objects reside in the combination of elements, arrangements of parts, and features of construction.

Still other objects will in part be obvious and in part be pointed out as the description of the invention proceeds and as shown in the accompanying drawings wherein.

Similar reference characters refer to similar parts throughout the several views of the drawings.

Figure 1:
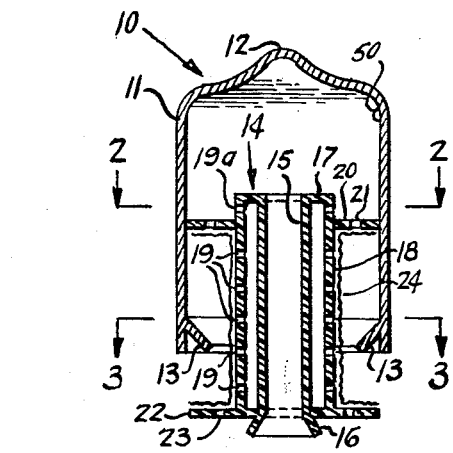
FIGURE 1 is a sectional view of one embodiment of the cartridge per se during assembly, showing the position in which coffee or the like is inserted.
Figures 2, 3:
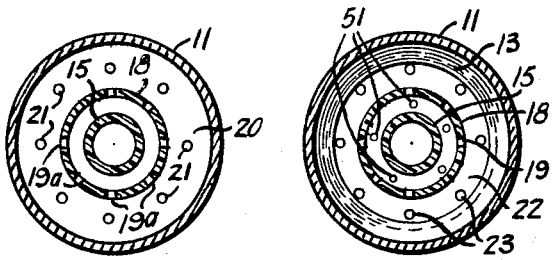
FIGURE 2 is a transverse cross-sectional view taken substantially on line 2—2 of FIGURE 1.
FIGURE 3 is a transverse cross-sectional view taken substantially on line 3—3 of FIGURE 1.
Figure 5:
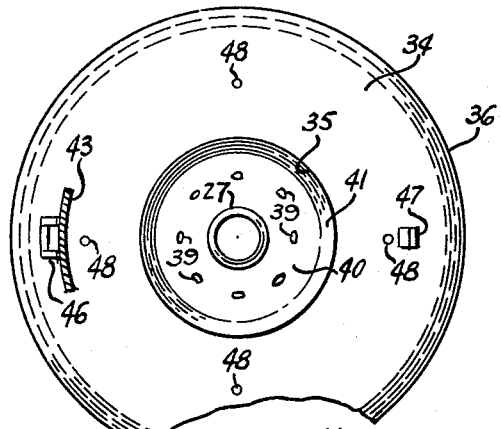
FIGURE 5 is a plan view taken substantially on line 5—5 of FIGURE 4, partially sectioned, and with the cartridge removed.

It is to be understood that although the descriptive matter herein is specifically directed to the preparation of coffee from the percolators and cartridges shown herein, tea leaves or other such material may be readily substituted for the coffee grounds if desired. Similarly, although certain embodiments shown in the drawings may be described herein as particularly designed for disposability or for reusability, any of the embodiments of the instant invention may be readily modified to render them disposable or reusable as desired.

Figure 4:
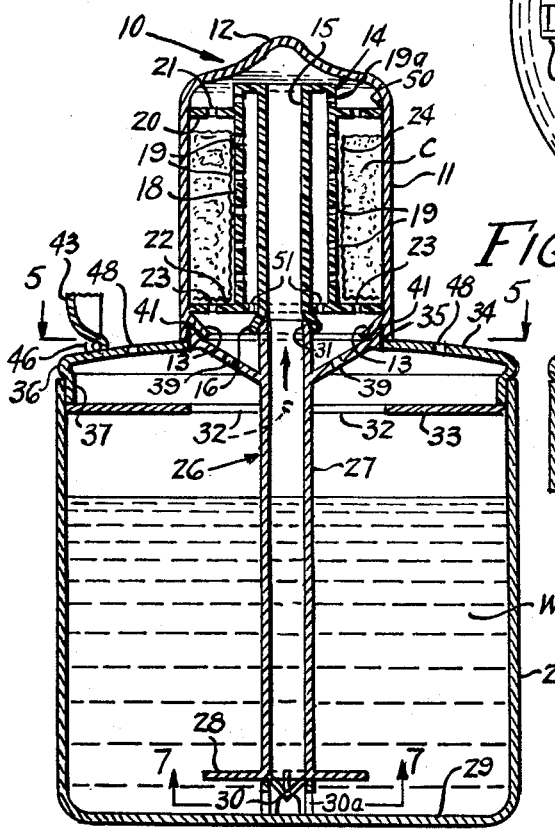
FIGURE 4 is a vertical cross-sectional view through one form of coffee percolator carrying a modified lid and the cartridge of FIGURES 1 to 3.
Figure 6:
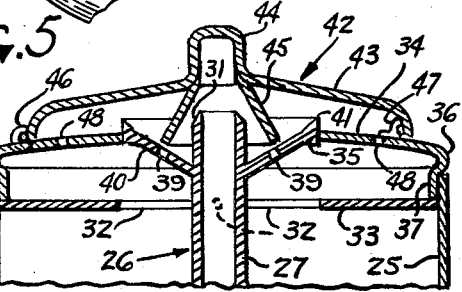
FIGURE 6 is a fragmentary vertical cross-sectional view similar to FIGURE 4, but showing the cover for the opening in the lid in closed position after the cartridge has been removed.
Figure 7:
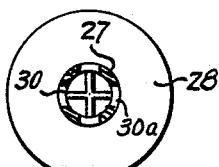
FIGURE 7 is a fragmentary cross-sectional view taken substantially on line 7—7 of FIGURE 4.

Referring now to the drawings, one embodiment of the cartridge of the instant invention is generally indicated at 10 and is shown in FIGURE 1 in partially assembled position for filling, and at FIGURE 4 in filled position ready for use. Cartridge 10 includes an outer shell or receptacle 11, provided with a dome-shaped top 12, an imperforate side wall portion, and a plurality of inwardly extending inclined lugs or an inwardly and downwardly extending frusto-conical flange such as shown at 13 adjacent the bottom thereof, the purpose of which will be more fully described hereinafter. Outer receptacle 11 of this embodiment, as well as the receptacles of the cartridges of the embodiments to be described hereinafter, is preferably made of transparent plastic, of light weight inexpensive material, such materials as heat resistant phenolic molded melamine or silicon phenolic plastic being advantageously employed for the purpose, although other materials such as glass, metal or the like may be substituted therefor, particularly if the cartridge is to be reusable.

A cartridge unit, generally indicated at 14, is positioned internally of receptacle 11, and comprises a central cartridge stem means 15 having a longitudinal bore and a flared bottom portion 16. An annular ring 17 extends between the top of stem 15 and a sleeve 18, the sleeve 18 being provided with a series of perforations 19, if desired, through the wall thereof, the annulus 17 being substantially solid. Certain of the openings 19, designated at 19a, are positioned above a perforated top plate or flange 20 having openings 21 therethrough which is fixedly secured to the outer periphery of sleeve 18, and extends into close juxtaposition with the inner wall of shell or receptacle 11, the space between the cartridge stem means 15 and the sleeve 18 defining a breather means. A similar lower flange or perforated plate 22 is provided just above the flared end portion of stem 16, the portion between stem 15 and shell 18 being apertured as at 51 and the portion between sleeve 18 and shell or receptacle 11 being provided with openings 23 through which coffee may fall. Filter paper 24 may be provided optionally to line the interior of the coffee containing receptacle which is provided by top plate 20, bottom plate 22, the outer periphery of sleeve 18 and the inner periphery of the side wall portion of receptacle 11. When in the position shown in FIGURE 1, the device may be inverted, and coffee poured into the space between bottom plate 22 and shell 11, until a desired charge is provided, after which the bottom plate 22 is forced inwardly manually, during the manufacture and assembly of the device and either snaps past or overrides flange 13 until it assumes the position of FIGURE 4. Either the flange 13 or the flange 22 may be flexible to effect this result.

The unit is then completely assembled, filled with coffee, and ready for use. It will be readily apparent that the unit hereinbefore described may be disposed of after a single use. However, on large installations the outer shell 11 may be made of metal, and reused, provision being made for removing the interior unit 14 and refilling the coffee containing space as desired.

The cartridge is adapted to be employed with any conventional percolator 25, but in this embodiment, a special percolator stem means is employed in order to facilitate the use of the unit. The stem assembly is generally indicated at 26 and comprises a percolator stem means 27 which terminates in the usual bottom or boiling plate 28, and is supported above the bottom 29 of the percolator by spaced legs or angular wires 30 acting as guide elements and resting on apertured tube 30a secured to the bottom 29 in any conventional manner to permit the free passage of fluid into the stem 26. The upper end of stem 26 is beveled as at 31 to facilitate the seating of flared end 16 of stem 15 thereon when the device is in use. It will be readily understood that any conventional electrical heating element (not shown) may be incorporated as desired to provide a conventional electric percolator. An arcuate lid 34 is provided with a central opening 35, and an annular outer bead 36 which extends to a flange 37 which seats interiorly of the receptacle 25. An inclined flange or rim 40 is secured to the stem 26 and extends upwardly to a relatively sharp ridge 41 which extends above the edges of the opening 35. In the use and operation of the device the flange 13 is adapted to engage over sharp ridge 41 securely to maintain cartridge or unit 10 in position when in use. A plate 33 is secured to stem 26 by spaced thin strips of metal 32 and has an outer peripheral edge slidingly engaging the inner surface of the percolator 25.

A closure or cover is generally indicated at 42 for the purpose of closing top opening 35 when unit 10 is removed therefrom, and comprises a disc 43 having a central raised handle portion 44 with an inverted frustoconical guide 45 positioned interiorly of the lid over the beveled end 31 of stem 27 and within the ridge 41 of flange 40. The cover is hinged as at 46 to one side of the lid 34 and is provided with a catch 47 at its opposite side. Suitable vent holes 48 may be provided optionally in the lid 34 exteriorly of the receptacle 11. Such vents may or may not be desirable.

In order to prevent the insertion of unit 14 too deeply into shell or receptacle 11 a bead 50 is provided defining top limits to which upper plate 20 may be inserted.

In the use and operation of the device the cover 42 is swung about its hinge 46 to open position, after the pot has been filled with water W, and the percolator stem assembly 26 is inserted. The cartridge 10 is then positioned as shown in FIGURE 4, and the percolator placed over a heating unit or electrically heated if provision is made for same. Then the boiling water W, in percolator 25 rises through percolator stem means 27 in the usual manner and also upwardly and outwardly through cartridge stem means 15, from whence it falls back through perforations 21 into the coffee C contained in the receptacle or space for containing coffee previously described between the plates 20 and 22. The water then permeates the coffee and passes through filter paper 24, if used, and out through the openings 23 and/or 19 from which it falls through openings 51 between sleeve 18 and stem 15 and through the openings 23 downwardly onto the flange 40 and through the openings 39 and the spaces provided by the wires or spacers 32 back into the percolator, the procedure cyclically repeating until the coffee is finished.

Among the other advantages achieved by this device is the fact that due to the provision of units which may be individually sealed the coffee remains perfectly fresh until use of each unit and the entire unit may be discarded before closing the cover 42 and pouring the coffee thus assuring that the grounds would never stand in the coffee to make it bitter nor would the coffee run through the grounds again while pouring. The unit 10 may be readily removed by merely disengaging the contact of the flange 13 with the ridge 41 and the flared portion 16 of the stem 15 with the beveled end 31 of the stem 26. By inverting the cartridge 10 on removal leakage or liquid, as with the basket conventionally used, is prevented.

An additional advantage is that when one wishes to make a second pot of coffee at once, or wishes to empty the grounds, there is no hot basket to handle, the used unit 10 being readily removable and easily replaced by a fresh unit.

It is to be understood that while the present invention is described and shown as being adapted for use with the receptacle of a conventional coffee percolator by the use of a special stem assembly, that the same may be manufactured as an integral unit initially, and sold as a complete assembly with a suitable supply of disposable cartridges.

The size of the apertures 19a defining the breather means or vent in dimensioned to limit the passage of vapor thereby increasing the pressure above the coffee C and decreasing the brewing time. If the breather holes are large, the water will also pass through the coffee under the influence of gravity. If the breather holes are dimensioned so that water will build up to approximately ¼ inch above the upper plate 20 before the explosions therewithin begin, pressure is built up in the space above the upper plate 20 which eventually pushes the water down through the coffee. The water W comes up through the percolator stem means 27 and the cartridge stem means 15 and splashes against the interior of the dome-shaped top 12 of the receptacle 11 falling on the perforated plate 20. When enough water has entered the space above the plate 20 and the pressure is built up, the breather apertures 19a will be choked off and the water will be pushed down through the coffee C, any vapor or steam passing down through the coffee being condensed. A vapor lock is caused within the space above the upper plate 20 which for approximately a second stops the water coming up through the cartridge stem means 15. As the pressure begins to push water through the coffee C, fresh air will enter through the breather means to allow the water to again pass through the cartridge stem means 15. The explosive action which forces the water down through the coffee in the cartridge has been found to utilize every bit of coffee nectar within the grounds. On experimentation, when a cartridge was used a second time in an attempt to make another pot of coffee, the percolated water was found to be completely used up. The increased pressure causes a quicker brewing operation since the water is forced down through the coffee under pressure and at an increased speed whereas with conventional methods the coffee merely passes through the grounds under the influence of gravity.

With percolators used heretofore when the water is drawn up through the stem means to hit the top plate or dome, the majority of the water then seeps down through the coffee, but some of the water has been found to overflow the side of the basket. This overflow water, which also incorporates a large percentage of steam, carries a considerable amount of aroma over the side of the basket which escapes out through the pouring spout and is lost. The cartridge method of the instant invention captures all of the aroma since the water is forced down through the coffee with none of the vapor escaping thereby producing a better tasting and smelling product.

It will now be seen that there is herein provided an improved combination percolator and coffee containing cartridge, the various embodiments of which satisfy all of the objectives of the instant invention, and others, including many advantages of great practical utility and commercial importance.

Since many embodiments may be made of the instant inventive concept, and since many modifications may be made of the embodiments hereinbefore shown and described, it is to be understood that all matter herein is to be interpreted merely as illustrative, and not in a limiting sense.

I claim:

1. In combination with a coffee percolator having a lid with a central opening therein and a tubular stem concentric with said opening, a prepacked coffee containing cartridge comprising a dome-shaped imperforate outer receptacle, an imperforate central tubular stem having an open upper end and a flared lower end, said flared lower end seating on said first-mentioned stem, an outer perforated sleeve coaxially surrounding said second mentioned stem, means closing the space between said second mentioned stem and said sleeve at the top, an annular top plate having openings therethrough extending between said sleeve and said outer receptacle adjacent the top thereof, a removable bottom plate having openings therethrough extending between the bottom of said sleeve and said outer receptacle, said top and bottom plates and the portions of said sleeve and said outer receptacle between said plates defining an annular coffee containing space, and means removably mounting said cartridge exteriorly on the upper side of said lid overlying said opening.

2. A structure in accordance with claim 1 further comprising a filter means interposed within the coffee containing space adjacent said top and bottom plates and said sleeve.

3. A structure in accordance with claim 1 wherein said outer receptacle is comprised of transparent plastic.

4. A structure in accordance with claim 1 further comprising a cover for said opening of said lid hinged to said lid to close said opening when said cartridge is removed.

5. A structure in accordance with claim 1 wherein said last-mentioned means comprises an inturned annular flange carried by the bottom of said outer receptacle interiorly thereof, and an annular rim surrounding said central opening over which said flange engages.

6. A self-contained cartridge for a coffee percolator including a tubular stem comprising a dome-shaped outer receptacle having an imperforate side wall portion, a central stem having an imperforate side wall portion, an open upper end and a flared lower end, said flared lower end seating on said first-mentioned stem, a sleeve surrounding said second mentioned stem, means closing the space between said second mentioned stem and said sleeve at the upper ends thereof, an annular top plate having openings therethrough, secured to said sleeve and slidingly received internally of said outer receptacle adjacent the top thereof, and a bottom plate having openings therethrough, secured to said sleeve and slidingly received internally of said outer receptacle, said top and bottom plates, and the side wall portions of said sleeve and said outer receptacle between said plates defining an annular coffee containing space, said cartridge being removably positioned on the upper side of said lid.

7. A coffee percolator of the character described comprising a coffee pot having a lid removably applied to the upper end thereof, an enlarged centrally disposed aperture in said lid, a fountain tube which is disposed in said receptacle in axial alignment with said aperture with the upper end thereof extending into said aperture, and a coffee cartridge which is removably mounted on said lid about said aperture and extends upwardly therefrom in axial alignment with said aperture and said fountain tube; said cartridge comprising, an imperforate cylindrical wall defining a receptacle which is open at the lower end thereof and is closed at the upper end thereof by a dome-shaped top, and a coffee container which is removably mounted in said receptacle co-axial therewith; said container comprising an elongated open ended cylindrical tube, a co-axial perforated tubular sleeve which is disposed about said tube in spaced relation thereto thereby providing an annular chamber between said tube and said sleeve which is open at the lower end thereof and is closed at the upper end thereof by a ring which is connected to and between the upper ends of the tube and sleeve, a pair of vertically spaced similar perforated annular flanges, one of which is secured to said sleeve about the lower end thereof and the other of which is secured about said sleeve in slightly spaced relation below the upper end of said sleeve; said flanges slidably engaging the inner surface of said cylindrical wall and defining with said sleeve and said cylindrical wall an annular chamber for the reception of ground coffee; and the lower end of said cylindrical tube being disposed in engagement with the upper end of said fountain tube and constituting an extension thereof.

8. A coffee percolator as defined by claim 7 in which said fountain tube is provided adjacent the upper end thereof with an upwardly and outwardly flaring perforated conical flange which extends out through the said aperture in said lid, and in which said cylindrical wall is provided adjacent the lower open end thereof with an inwardly and downwardly flaring conical flange, the outer surface of said inwardly and downwardly flaring flange being disposed in engagement with the inner surface of said upwardly and outwardly flaring flange when said cartridge is mounted on said lid.

9. A coffee percolator as defined by claim 7 in which a cover, which is adapted to enclose the said aperture in said lid when said cartridge is removed from said lid, is hingedly secured to said lid.

10. A coffee percolator as defined by claim 9 in which said cover is provided with a central downwardly and outwardly flaring conical deflector which is disposed about the upper end of said fountain tube when said cover is in closing position.

References Cited by the Examiner
UNITED STATES PATENTS

| | | | |
|---|---|---|---|
| 866,985 | 9/1907 | Trewhella | 99—312 X |
| 1,377,316 | 5/1921 | Clermont | 99—295 |
| 1,412,388 | 4/1922 | Clermont | 99—295 |
| 2,020,104 | 11/1935 | Collin | 99—312 |
| 2,096,849 | 10/1937 | Felix | 99—285 X |
| 2,778,739 | 1/1957 | Rodth | 99—295 X |
| 3,083,100 | 3/1963 | Baran | 99—295 |
| 3,095,801 | 7/1963 | Fogg | 99—312 |
| 3,119,694 | 1/1964 | Gauld | 99—295 X |

WALTER A. SCHEEL, *Primary Examiner.*